United States Patent [19]

Fuchs et al.

[11] Patent Number: 5,056,050

[45] Date of Patent: Oct. 8, 1991

[54] METHOD FOR DETERMINING THE NECESSITY OF ADJUSTING A HIGH-RESOLUTION ELECTRONIC BALANCE

[75] Inventors: Fritz Fuchs, Uster; Linus Meier, Saland; Arthur Reichmuth, Wetzikon, all of Switzerland

[73] Assignee: Mettler-Toledo AG, Greifensee, Switzerland

[21] Appl. No.: 418,927

[22] Filed: Oct. 6, 1989

Related U.S. Application Data

[63] Continuation of Ser. No. 31,074, Mar. 26, 1987, abandoned.

[30] Foreign Application Priority Data

May 23, 1986 [CH] Switzerland ................ 02094/86

[51] Int. Cl.$^5$ .......................................... G01G 23/01
[52] U.S. Cl. ................... 364/571.03; 364/567
[58] Field of Search ............. 364/567, 571.01, 571.03; 177/25.19, 25.11, 1

[56] References Cited

U.S. PATENT DOCUMENTS

| | | | |
|---|---|---|---|
| 3,786,884 | 1/1974 | Allenspach | 364/571 |
| 4,080,657 | 3/1978 | Caldicott et al. | 364/567 |
| 4,139,069 | 2/1979 | Domis et al. | 364/567 |
| 4,192,005 | 3/1980 | Kurtz | 364/571 |
| 4,193,039 | 3/1980 | Massa et al. | 328/162 |
| 4,310,893 | 1/1982 | Loshbough | 364/567 |
| 4,412,298 | 10/1983 | Feinland et al. | 364/567 |
| 4,447,885 | 5/1984 | Biss | 364/568 |
| 4,535,854 | 8/1985 | Gard et al. | 177/1 |
| 4,627,505 | 12/1986 | Kunz | 177/1 |
| 4,656,599 | 4/1987 | Knothe et al. | 364/567 |
| 4,751,661 | 6/1988 | Amacher et al. | 364/567 |
| 4,858,145 | 8/1989 | Inoue et al. | 364/567 X |
| 4,858,161 | 8/1989 | Baumann | 364/567 X |

FOREIGN PATENT DOCUMENTS

| | | |
|---|---|---|
| 0044707 | 1/1982 | European Pat. Off. |
| 53-69669 | 6/1978 | Japan |
| 56-4017 | 6/1981 | Japan |

*Primary Examiner*—Parshotam S. Lall
*Assistant Examiner*—S. A. Melnick
*Attorney, Agent, or Firm*—Pennie & Edmonds

[57] ABSTRACT

In a process according to the invention for automatic calibration and/or linearization of a high-resolution electronic balance, point values are assigned by a function to the disturbance variables (parameters) that can affect the weighing result. A calibration and/or linearization is indicated or triggered when the accumulated point values reach a triggering point value (Xa) that is presettable, balance-specific and/or dependent on the environment. The calibration and/or linearization can also be triggered when the accumulated point value of a single disturbance variable reaches a triggering point value which is below point number (Xa).

8 Claims, 3 Drawing Sheets

METHOD FOR DETERMINING THE NECESSITY OF ADJUSTING A HIGH-RESOLUTION ELECTRONIC BALANCE

This is a continuation of application Ser. No. 031,074, filed Mar. 26, 1987 now abandoned.

BACKGROUND OF THE INVENTION

The invention relates to a method for the automatic adjustment of a high-resolution electronic balance, in which the changes in parameters affecting the balance are detected and processed by an evaluation circuit of the balance and/or a microprocessor.

In high resolution balances, changes in parameters (or disturbance variables) such as temperature, air pressure, aging of the components, etc., affect the balance so that the indicated weight is not correct. A periodic adjustment of the balance therefore is absolutely necessary.

Error compensation methods for electronic high-resolution balances are known. From DE-A1-31 06 534 it is known to detect the current air pressure and continuously to take the detected value into consideration in the electronic evaluation of the weight.

In CH-PS 624 773, correction values for several components which can affect the measurement result are detected and recorded. Moreover, temperature coefficients and changes in values caused by age are detected and taken into consideration by a computer in the calculation of the final measurement result.

These known error compensation methods use changes in values of the factors affecting the measurement result for continuous correction of the calculated measurement result. But such continuous correction of a high-resolution balance makes the adjustment procedure very expensive because the sensors necessary for detection of the external disturbance variables (temperature, etc.) must work very precisely for continuous detection and must produce reproducible values.

Another known method described in EU-A1-0 044 707 comprises an automatic recalibration which is triggered if a specific time has passed or a given number of weighings have been made or after each taring. Such a rigid recalibration rule results in recalibration being performed when objectively it would not be necessary, and thus constitutes an often unnecessary disturbance during a series of weighings.

Only a small part of the adjustment problems can be solved with the known processes.

SUMMARY OF THE INVENTION

An object of the present invention is to provide a method which detects a number of factors affecting the measurement result and triggers a calibration and/or linearization on an as needed basis so that an adjustment is made only if it is really necessary for weighing accuracy or other reasons such as safety.

The invention attains this object by detecting changes in at least one parameter and converting each change, by a predetermined function, into numerical point values which are stored and accumulated. After the accumulated point value reaches a triggering point number (Xa), a calibration and/or linearization of the balance is indicated and/or initialized.

This procedure allows proper adjustments of the balance to be made without constant correction of the measurement result. Calibration and/or linearization is triggered only if the triggering number is reached, which makes a correction really necessary. Generally, this adjustment takes place if a weighing is not in progress at that moment. This procedure also permits the weighing system to take into consideration disturbance variables whose direct processing in the measurement result is possible only with difficulty or not at all.

The invention for the case of a calibration is explained in more detail by examples. The method for linearization runs analogously.

BRIEF DESCRIPTION OF THE DRAWING

These and other objects, features and elements of the invention will be more readily understood from the following detailed description of a preferred embodiment of the invention in which.

DETAILED DESCRIPTION OF PREFERRED EMBODIMENT

Figure 1:
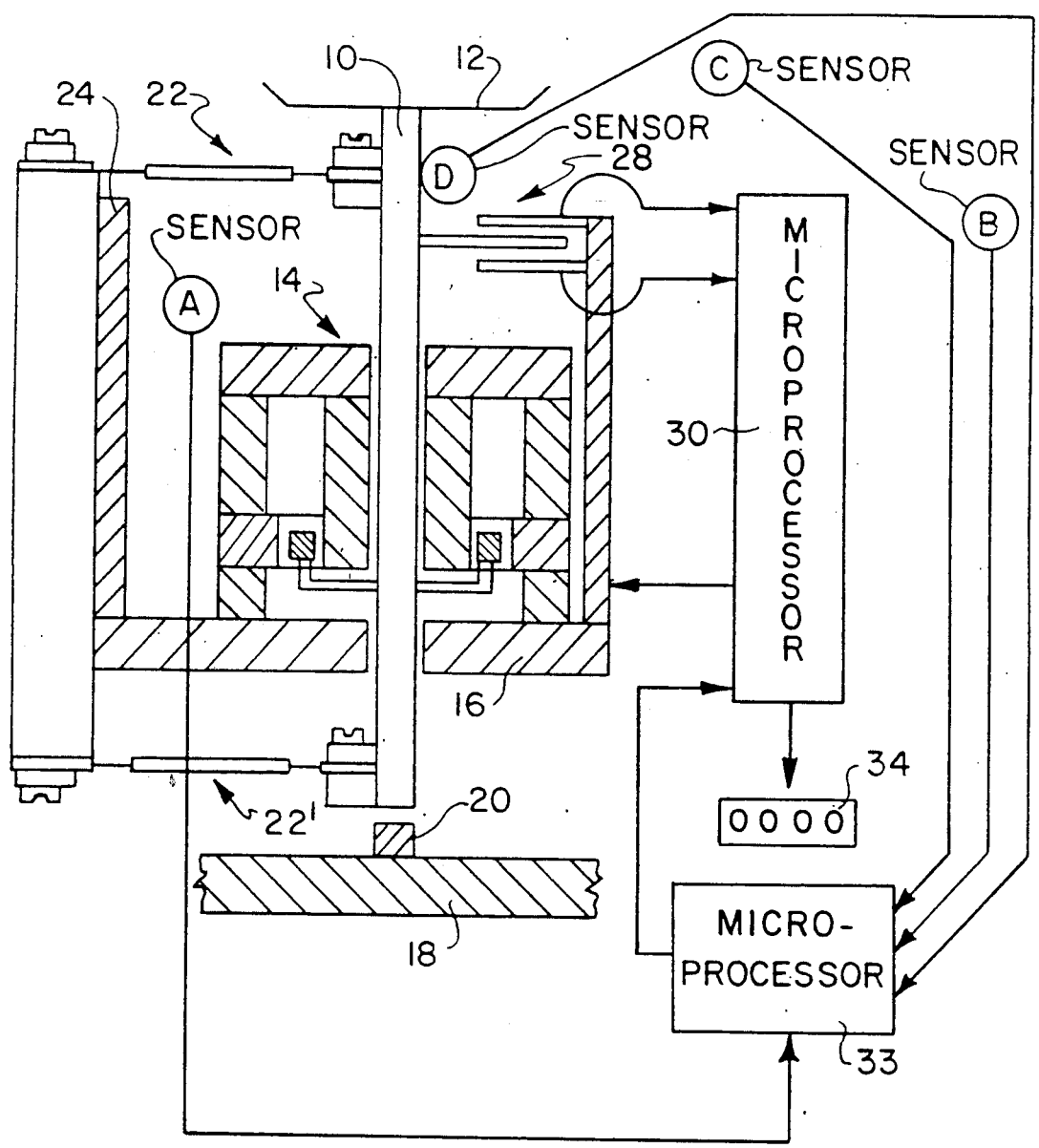
FIG. 1 shows an illustrative embodiment of a balance and sensors with which disturbance variables affecting the measurement result can be detected.

As shown in FIG. 1, balance 1 comprises a vertically movable support 10 on whose upper end is fastened a scalepan 12. The support goes, with play, through a central bore of a permanent magnet system 14 which is placed on an arm 16 of balance stand 18. A stop 20 prevents inadmissibly large deflections of support 10.

Two bending guide rods 22, 22', in triangular form, are fastened on a side wall 24 of the balance stand to guide support 10 in a parallel manner. When scalepan 12 is loaded, a position transmitter 28 signals a deflection of support 10 from the desired position. This signal serves for controlling the coil current, which is processed in an electric evaluation circuit 30 and digitally represented on a display unit 34 in weight units.

A microprocessor 33—placed inside or outside balance 1—processes and evaluates signals from four sensors A, B, C, D, which are placed inside and outside of balance 1. Microprocessor 33 is connected to the microprocessor or evaluation circuit 30. Alternatively, evaluation circuit 30 can also be implemented in a microprocessor and the function of the elements 30 and 33 can be combined in a single microprocessor.

In microprocessor 33 the values coming from the sensors are individually calculated in a predetermined way and converted to numerical point values Xe and accumulated. The calibration and/or linearization values of the most recent or the last two, three or more calibrations and/or linearizations may also be taken into consideration in determining the point value.

The relationship between the change of the parameters (temperatures, pressure, etc.) and point value Xe can be described by a general type function. This function can depend not only on changes in the individual parameters but also on their first or higher derivatives as well as their integrals. Point value Xe, for example, can be a function of the following type: Xe = function (T1(t), T2(t), $\Delta$T1(t)/$\Delta$t, $\Delta$T2(t)/$\Delta$t, p(t) . . .

$$\int_{t_1}^{t_2} T1(t')dt',$$

. . . etc) wherein T1, T2 mean sensor temperatures, p means pressure, and t means time.

In the case of linearization, the function as a rule will differ from that in the case of calibration.

The evaluation of the change of the parameters does not have to take place individually. For example, more complex connections can be formulated, in which a point value is determined by changes in two or more parameters.

As soon as the accumulated point values reach a triggering number Xa specified in advance, the time for a calibration and/or linearization of balance 1 is indicated, e.g., optically or acoustically; or it is performed automatically.

The calibration and linearization can be performed together or independently of one another.

The technique in which the calibration and/or linearization takes place is not the object of this invention and therefore it not described in detail here. It can take place in a known way. Often the calibration is performed with one or more suitably motor-driven calibrating weights built into the balance. The linearization takes place as a rule with two or more built-in, suitably motor-driven weights. These weights can be identical with the calibrating weights.

Figure 2A:
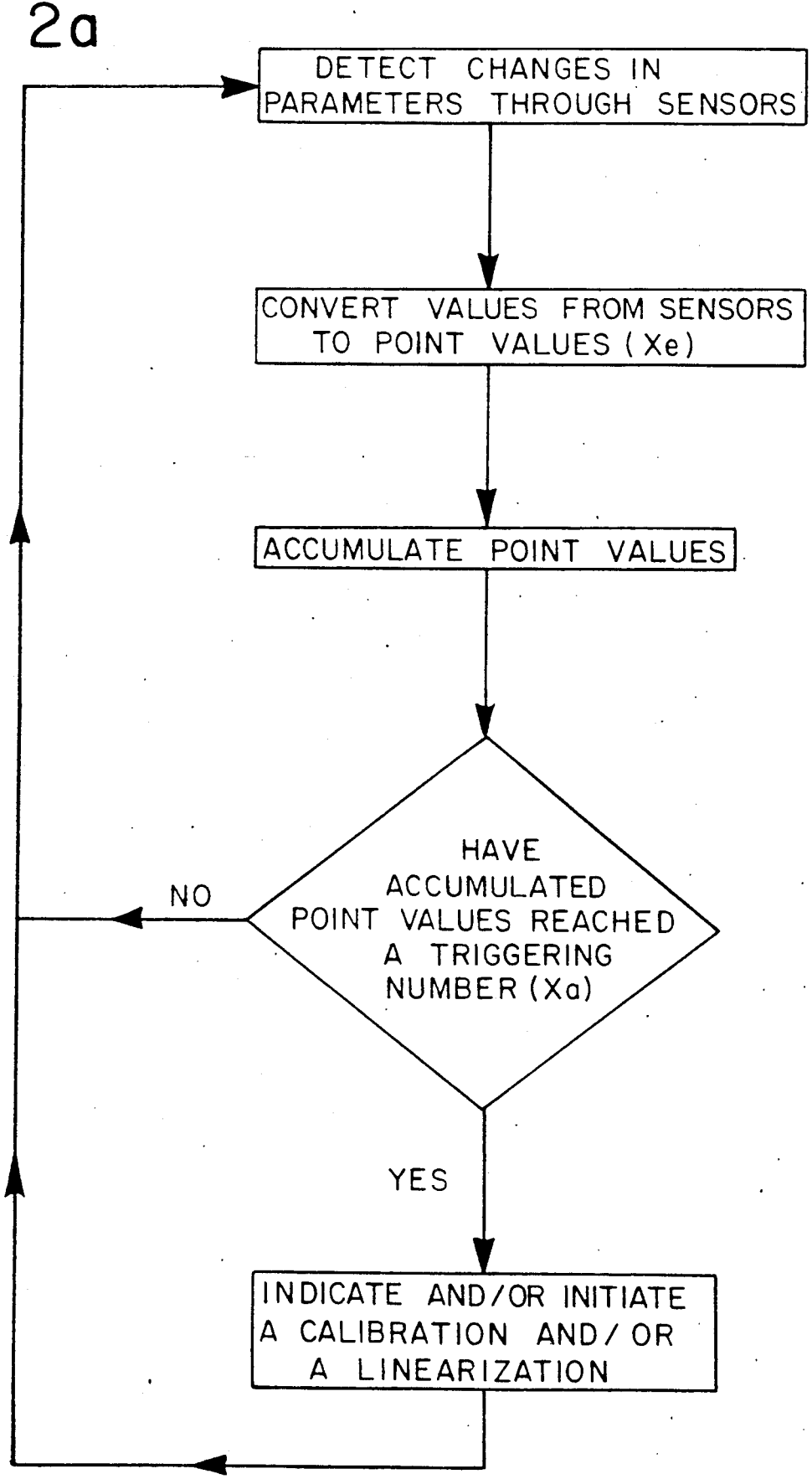
FIGS. 2a and 2b are flow diagrams illustrating the operation of two embodiments of the invention.

The example given below shows for the sake of simplicity and clarity a linear relation of the parameters and the evaluated point value Xe. The example should be read in conjunction with the flow diagram of FIG. 2a.

EXAMPLE

A temperature sensor (T1) within the housing of balance 1 is identified by reference symbol A and a temperature sensor (T2) outside the housing of balance 1 is identified by B. C is an air pressure sensor (p) and D is a sensor with which inclination (N) of balance 1 to the vertical can be determined.

The following is an example for the case of a calibration. In the case of linearization as a rule the weighting and the point value Xe are different, since the dependencies do not agree with those of the calibration. However, the procedure for linearization is the same as for calibration.

| Position | Parameter (sensor) | Change since last calibration | Weighting | Points (Xe) |
|---|---|---|---|---|
| A | temperature | $\Delta T1 = 1.0K$ | 1.4 pt/K | 1.4 |
| B | temperature | $\Delta T2 = 0.2K$ | 0.5 pt/K | 0.1 |
| C | pressure | $\Delta p = 200 \, N/m^2$ | $0.001 \, pt/N/m^2$ | 0.2 |
| D | inclination | $\Delta N = 0.04$ degree | 10 pt/degree | 0.4 |
| | Total points reached | | | 2.1 |

Triggering point number Xa is 2.0.

Thus, in this example, the predetermined triggering point number Xa of 2.0 points is reached or exceeded and a calibration is triggered or the need for a calibration is indicated.

In the example, the predetermined point number Xa of 2.0 is caused 70% by temperature change T1, while temperature change T2 has only a share of 5% in point number Xa. The accumulated point value may thus be considered a weighted sum.

Instead of the parameters shown in the example, fewer or more parameters can be included, e.g., the relative and absolute atmospheric humidity, the gas composition (with weighings in protective gas or in contaminated air), the air or gas density, electric and magnetic fields, vibrations or their effects on the balance, radioactivity, radiations of all types, aging of components, the position of the moon and sun, as well as the tides, etc.

In the example Xa = 2.0 has been established as the point number triggering the calibration. Point number Xa = 2.0 can be a balance-specific empirical value which has proved to be suitable.

Instead of solely using an empirical value, after an empirical value has been introduced at the installation of the balance, e.g. 2.0, in each case a new value which results from the changes of the last two or more calibration values can be established as triggering point number Xa. A simple case is an average value calculated from the point numbers of the two previous calibrations.

Automatic triggering of a calibration and/or linearization assumes as a rule that the balance is in the area of "0" and the weight change (dG/dt) is under a predetermined limit.

An optical or acoustical indication can be provided to make the operating person aware of the need for a calibration and/or linearization during a weighing continuing over a longer period. Then the decision to interrupt or break off the weighing is left up to the user.

The weighting of the change of the parameters, selected in the example, is purely by way of example and arbitrary; obviously, it must be selected and also if necessary subsequently matched according to the type of balance, the sensitivity and the range and place of use.

Figure 2B:
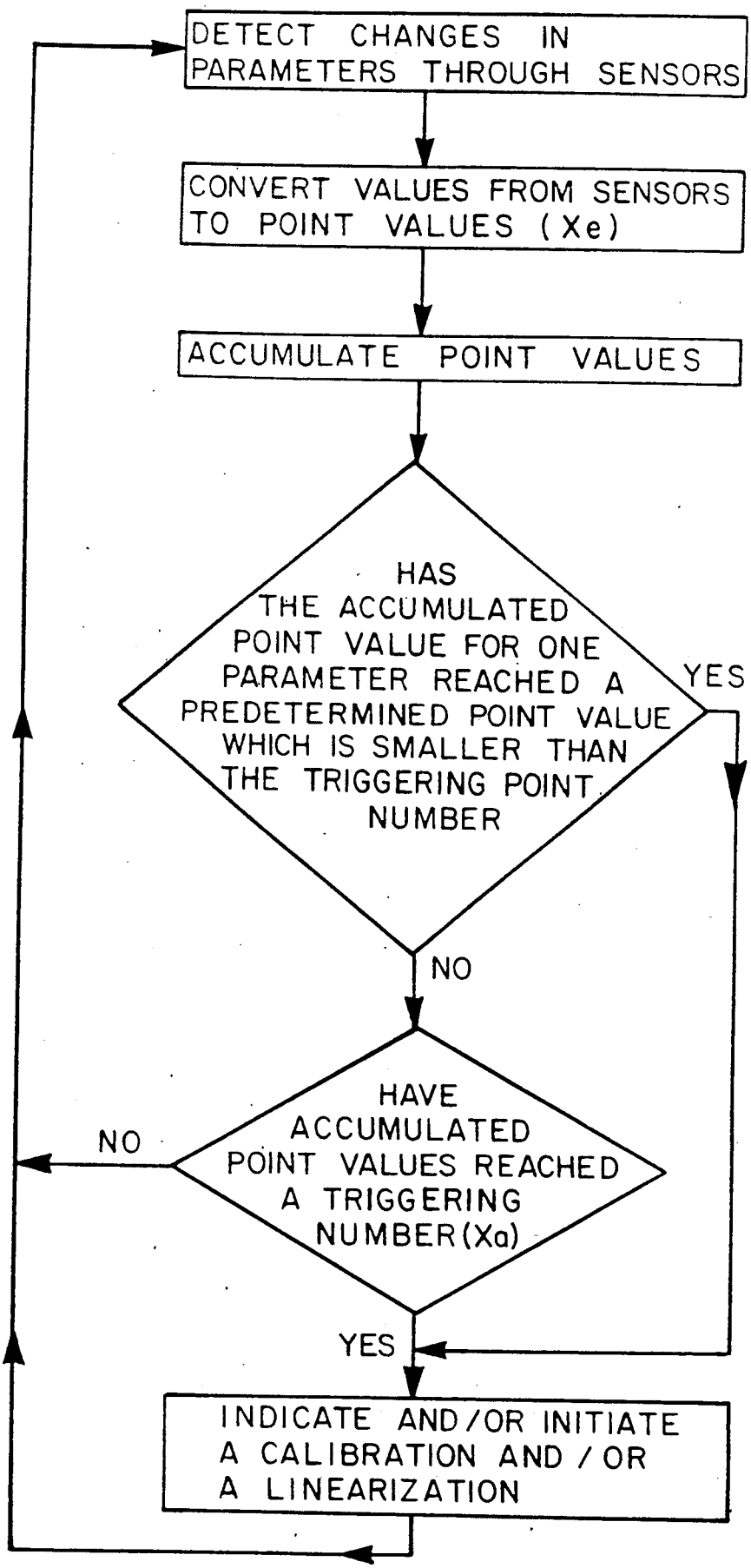

It is also possible to trigger or indicate the calibration and/or linearization not only when triggering point number Xa is reached but also when the accumulated point value Xe of an individual parameter reaches a predetermined value, whereby the latter predetermined value also can be substantially below triggering point number Xa. This embodiment of the invention is depicted in the flow diagram of FIG. 2b.

The total sum can, of course, be made up of positive and negative values, and for this reason there is the likelihood that often, despite change in some parameters, no calibration and/or linearization becomes necessary, since the changes offset one another.

In the present method the sensors used (e.g., for temperature detection) do not have to meet equally high requirements as in the case of direct error compensation.

The method is applicable to all electronic balances, regardless of the measuring principle used.

What is claimed:

1. A method for determining the necessity of adjusting a high-resolution electronic balance comprising the steps of:
   for each of a plurality of parameters that interfere with the accuracy of a weighing result, monitoring said parameters to detect changes in said paramaters affecting accuracy of a weighing result;
   converting each detected change in a parameter into a numerical point value that is a function of the magnitude of the change, using different functions to convert the changes in at least some of the different parameters;
   accumulating the numerical point values to obtain an accumulated point value associated with the changes in all the different parameters; and
   determining whether the accumulated point value has reached a triggering point number.

2. The method of claim 1 wherein the parameters in which changes are detected are selected from the group consisting of: change of temperatures inside or outside the balance, air pressure, inclination of the balance, relative or absolute humidity, gas composition, air or gas density of the environment, electric or magnetic fields, vibrations that have occurred since a previous weighing, radioactivity, aging of components of the balance, the position of the moon and sun, and the tides.

3. The method of claim 1 further comprising the step of calculating the triggering point number as a function of the triggering point number of at least one previous calibration of the balance.

4. The method of claim 1 further comprising the steps of:
   accumulating the numerical point values for each of said parameters to obtain a plurality of accumulated point values, each associated with the changes in one of the different parameters;
   determining whether at least one of the plurality of accumulated point values has reached a predetermined point value, said predetermined point value being smaller than said triggering point number; and,
   if said predetermined point value has been reached indicating that an adjustment of the balance is necessary.

5. The method of claim 1 further comprising the step of calculating the triggering point number as a function of at least one previous linearization of the balance.

6. The method of claim 1 further comprising the step of calculating the triggering point number as a function of at least one of the parameters in which changes are detected.

7. The method of claim 1 further comprising the step of varying the triggering point number.

8. The method of claim 1 further comprising the steps of:
   accumulating the numerical point values for each of said parameters to obtain a plurality of accumulated point values, each associated with the changes in one of the different parameters;
   determining whether at least one of the plurality of accumulated point values has reached a predetermined point value, said predetermined point value being smaller than said triggering point number; and,
   if said predetermined point value has been reached, initiating an adjustment of the balance.

* * * * *